United States Patent
Yoshizaki et al.

(10) Patent No.: US 10,430,963 B2
(45) Date of Patent: Oct. 1, 2019

(54) IMAGE PROCESSING APPARATUS, IMAGE READING APPARATUS, AND NON-TRANSITORY COMPUTER READABLE MEDIUM STORING PROGRAM

(71) Applicant: FUJI XEROX CO., LTD., Tokyo (JP)

(72) Inventors: Akane Yoshizaki, Kanagawa (JP);
Hiroyuki Kishimoto, Kanagawa (JP);
Kazuhiro Oya, Kanagawa (JP);
Shigeru Okada, Kanagawa (JP);
Kunihiko Kobayashi, Kanagawa (JP);
Shintaro Adachi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/802,411

(22) Filed: Nov. 2, 2017

(65) Prior Publication Data
US 2018/0240248 A1 Aug. 23, 2018

(30) Foreign Application Priority Data
Feb. 20, 2017 (JP) .................................. 2017-028725

(51) Int. Cl.
G06K 9/00 (2006.01)
G06T 7/60 (2017.01)
G06T 11/20 (2006.01)
G06T 7/73 (2017.01)
G06T 5/00 (2006.01)

(52) U.S. Cl.
CPC ............... *G06T 7/60* (2013.01); *G06T 5/001* (2013.01); *G06T 5/005* (2013.01); *G06T 7/73* (2017.01); *G06T 11/203* (2013.01); *G06T 2207/10008* (2013.01); *G06T 2207/10024* (2013.01); *G06T 2207/30176* (2013.01)

(58) Field of Classification Search
CPC ........... H04N 1/00037; H04N 1/00602; H04N 1/00798; H04N 1/02815; H04N 1/193
USPC ...... 382/103, 166, 204; 358/1.9, 515; 412/11
See application file for complete search history.

(56) References Cited

U.S. PATENT DOCUMENTS

| | | | | |
|---|---|---|---|---|
| 5,850,478 A * | 12/1998 | Suzuki | ..................... | H04N 1/38 382/204 |
| 8,654,394 B2 * | 2/2014 | Ikuno | ..................... | G06T 9/00 358/1.9 |

FOREIGN PATENT DOCUMENTS

JP 2010-154319 7/2010

* cited by examiner

*Primary Examiner* — Charlotte M Baker
(74) *Attorney, Agent, or Firm* — JCIPRNET

(57) ABSTRACT

An image processing apparatus includes a punch hole trace detection unit that detects a punch hole trace from an input image, a line segment detection unit that detects a line segment which is positioned in a vicinity of the detected punch hole trace, and a punch hole trace processing unit that performs processing on the punch hole trace on the basis of a result of the detection by the line segment detection unit.

13 Claims, 12 Drawing Sheets

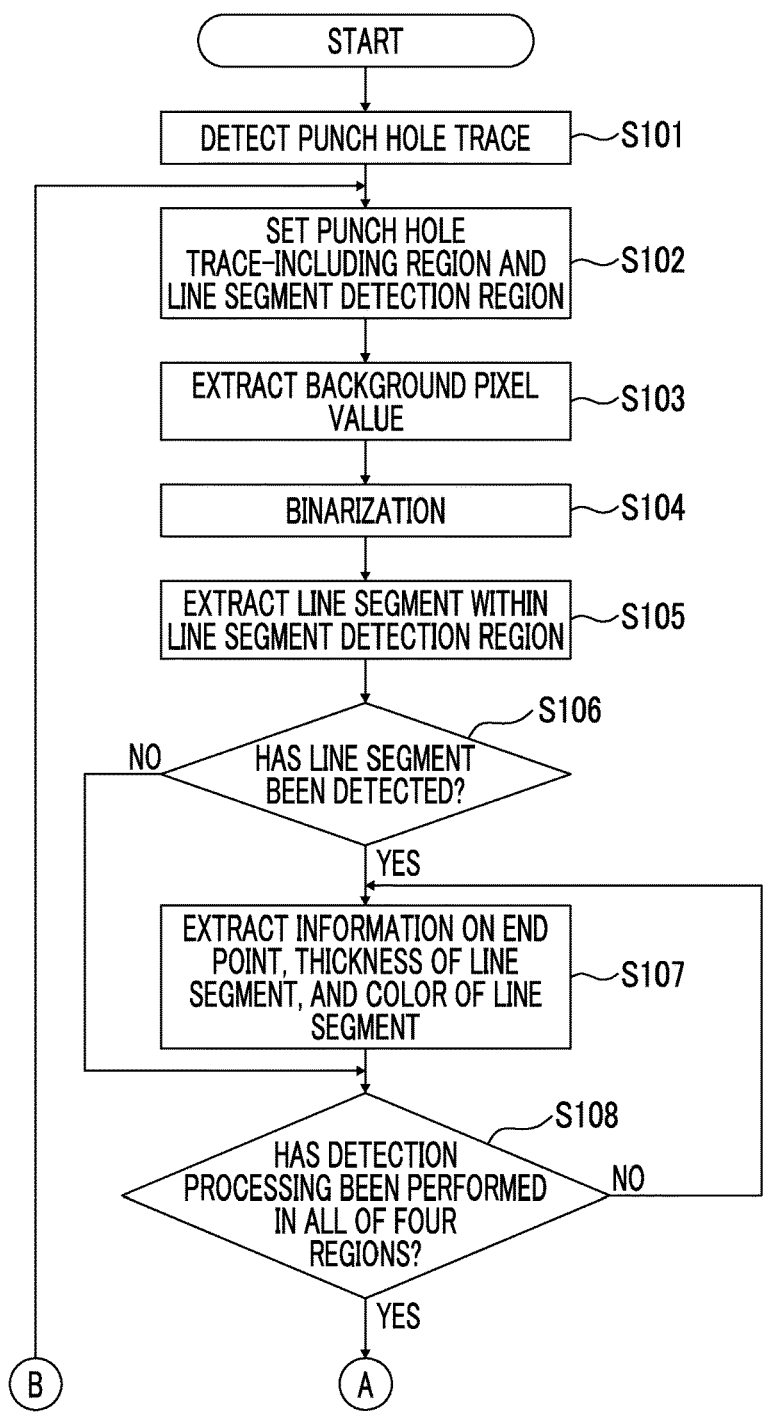

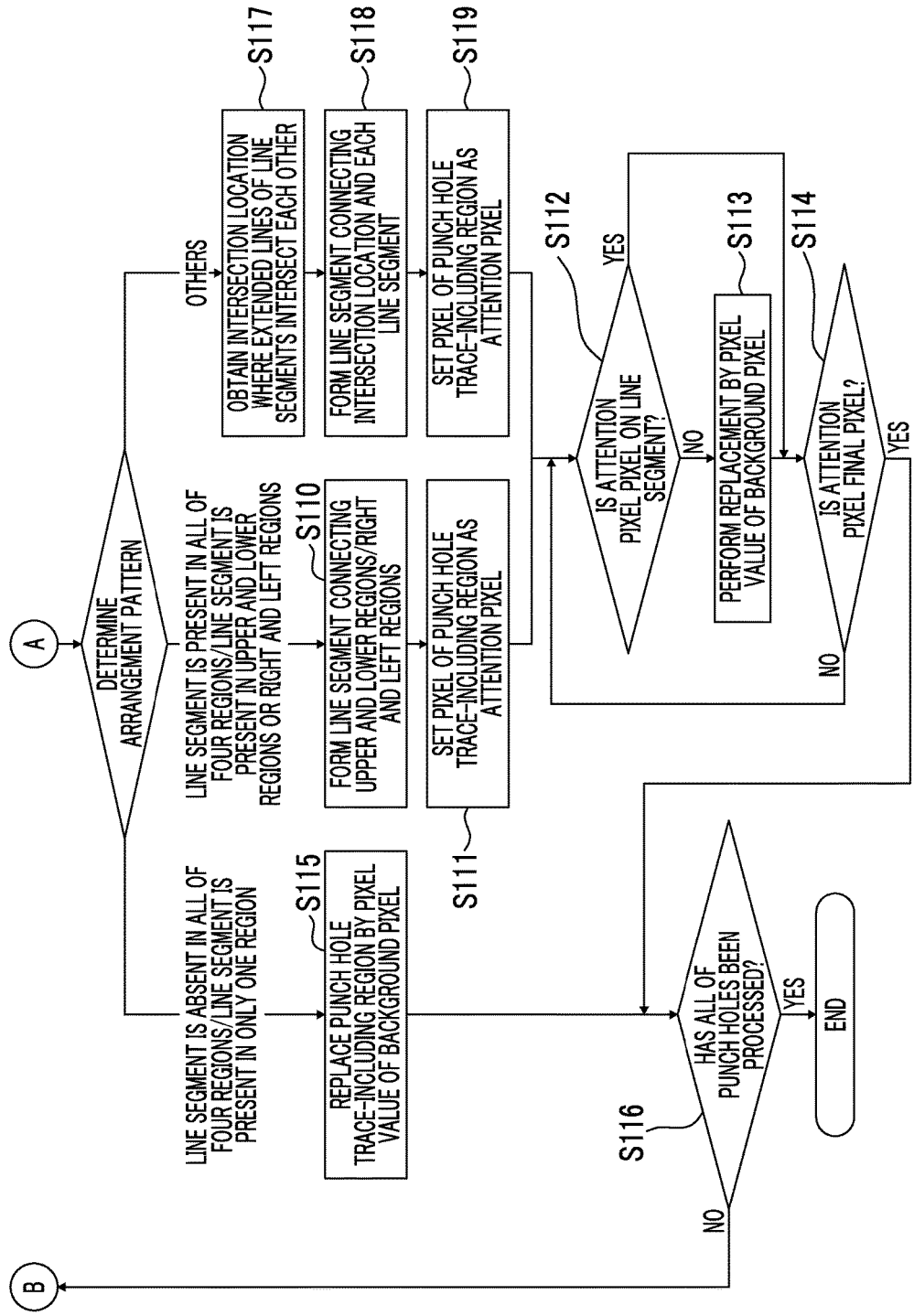

IMAGE PROCESSING APPARATUS, IMAGE READING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-028725 filed Feb. 20, 2017.

BACKGROUND

Technical Field

The present invention relates to an image processing apparatus, an image reading apparatus, and a non-transitory computer readable medium storing a program.

SUMMARY

According to an aspect of the invention, there is provided an image processing apparatus including a punch hole trace detection unit that detects a punch hole trace from an input image, a line segment detection unit that detects a line segment which is positioned in a vicinity of the detected punch hole trace, and a punch hole trace processing unit that performs processing on the punch hole trace on the basis of a result of the detection by the line segment detection unit.

BRIEF DESCRIPTION OF THE DRAWINGS

Exemplary embodiment(s) of the present invention will be described in detail based on the following figures, wherein:

FIG. 8 is a flow chart illustrating a series of flows of processing;

FIG. 9 is a flow chart illustrating a series of flows of processing;

DETAILED DESCRIPTION

Hereinafter, exemplary embodiments of the invention will be described in detail with reference to the accompanying drawings.

Figure 1:
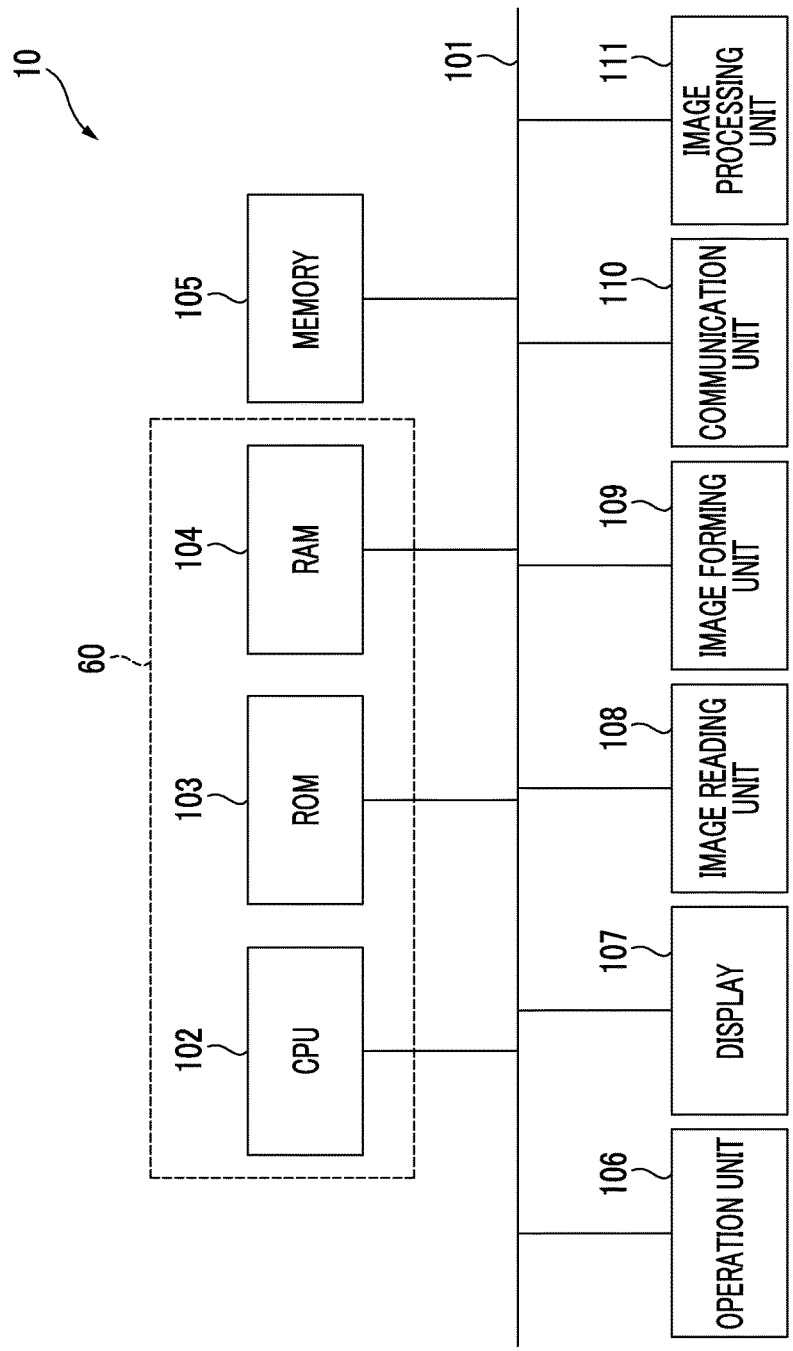
FIG. 1 is a diagram illustrating an image forming apparatus according to this exemplary embodiment.

FIG. 1 is a diagram illustrating an image forming apparatus 10 according to this exemplary embodiment.

As illustrated in FIG. 1, functional units constituting the image forming apparatus 10 according to this exemplary embodiment are connected to a bus 101, and transmit and receive data through the bus 101.

An operation unit 106 receives an operation of a user. The operation unit 106 is constituted by, for example, a hardware key. In addition, for example, the operation unit is constituted by a touch panel that outputs a control signal based on a pressed position.

A display 107 is constituted by, for example, a liquid crystal display, and displays data regarding the image forming apparatus 10 under the control of a CPU 102. In addition, the display 107 displays a menu screen to be referred to as the user when the user operates the image forming apparatus 10.

An image reading unit 108 as an example of an image reading unit is constituted by a so-called scanner apparatus, and reads an image on a set manuscript to generate reading image data.

An image forming unit 109 forms a toner image based on image data on a sheet by using, for example, electrophotography. Meanwhile, the image forming unit 109 may perform image forming by using another method such as an ink jet head system.

The communication unit 110 is connected to a communication line (not shown), and functions as a communication interface for performing communication with another apparatus connected to the communication line.

An image processing unit 111 performs image processing, such as color correction or gradation correction, on an image represented by image data.

A memory 105 is constituted by a storage apparatus such as a hard disk device and stores, for example, data received by the communication unit 110 or reading image data generated by the image reading unit 108.

A controller 60 controls each unit of the image forming apparatus 10. The controller 60 is constituted by the Central Processing Unit (CPU) 102, a Read Only Memory (ROM) 103, and a Random Access Memory (RAM) 104.

The ROM 103 stores a control program executed by the CPU 102. The CPU 102 reads out the control program stored in the ROM 103, and executes the control program with the RAM 104 as a work area.

When the control program is executed by the CPU 102, each unit of the image forming apparatus 10 is controlled by the CPU 102, and the image forming apparatus 10 forms an image on, for example, a sheet and reads a manuscript to generate reading image data of the manuscript.

Figure 2:
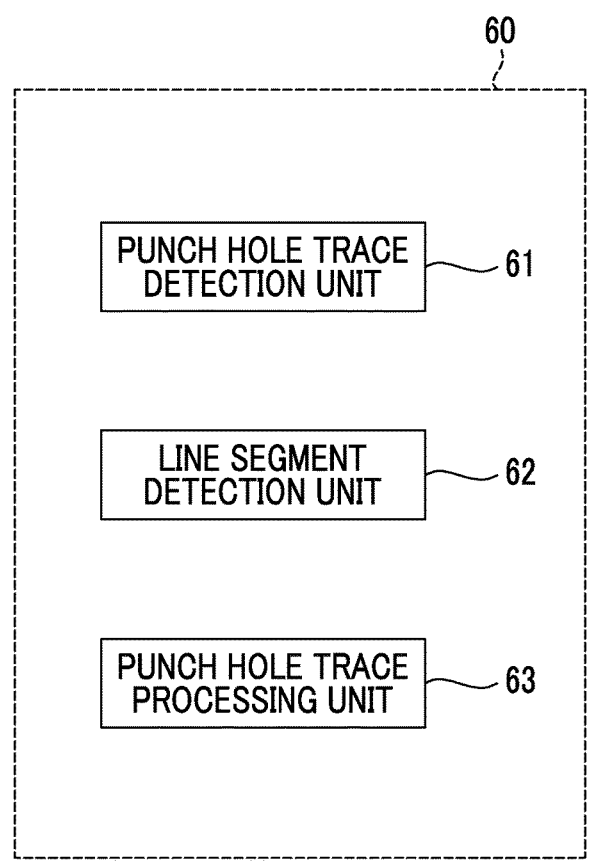
FIG. 2 is a block diagram illustrating a functional configuration of a controller.

In addition, in this exemplary embodiment, the control program is executed by the CPU 102, so that the controller 60 functions as a punch hole trace detection unit 61, a line segment detection unit 62, and a punch hole trace processing unit 63, as illustrated in FIG. 2 (block diagram illustrating a functional configuration of the controller 60).

The punch hole trace detection unit 61 as an example of a punch hole trace detection unit analyzes the reading image data (an example of an input image) which is generated by the image reading unit 108, and detects a punch hole trace in a case where the punch hole trace is included in the reading image data.

Meanwhile, the detection of the punch hole trace by the punch hole trace detection unit 61 may be performed by an existing technique, or may be performed, for example, by detecting a pixel which exceeds a pixel value determined in advance and is disposed in a shape determined in advance.

The line segment detection unit 62 as an example of a line segment detection unit detects a line segment, such as a ruled line, which is positioned in the vicinity of the detected punch hole trace.

The punch hole trace processing unit 63 as an example of a punch hole trace processing unit determines processing on a punch hole trace on the basis of a detection result of the line segment detection unit 62, and performs the determined processing on the punch hole trace. Specifically, the punch hole trace processing unit makes the punch hole trace inconspicuous or interpolates a line segment missed due to a punch hole.

Here, in this exemplary embodiment, portions where the punch hole trace detection unit 61, the line segment detection unit 62, and the punch hole trace processing unit 63 are provided can be captured as an image processing apparatus that performs processing related to a punch hole trace.

In addition, the portions of the image reading unit 108 (see FIG. 1) and the controller 60 can be captured as an image reading apparatus that performs reading of a manuscript and processing related to a punch hole trace included in reading image data obtained by the reading.

The punch hole trace detection unit 61, the line segment detection unit 62, and the punch hole trace processing unit are realized by cooperation of software and hardware resources.

Specifically, in this exemplary embodiment, the ROM 103 (see FIG. 1) or the memory 105 stores an operating system, application software executed in cooperation with the operating system, and the like. In this exemplary embodiment, the CPU 102 reads these programs to the RAM 104 which is a principal storage apparatus from the ROM 103 and the like and executes these programs so that the functional units of the punch hole trace detection unit 61, the line segment detection unit 62, and the punch hole trace processing unit 63 are realized.

Here, the programs executed by the CPU 102 may be provided to the image forming apparatus 10 in a state of being stored in a computer readable recording medium such as a magnetic recording medium (a magnetic tape, a magnetic disc, or the like), an optical recording medium (optical disc), a magneto-optical recording medium, or a semiconductor memory.

In addition, the programs executed by the CPU 102 may be downloaded to the image forming apparatus 10 by using a communication unit such as the Internet.

Figure 3A:
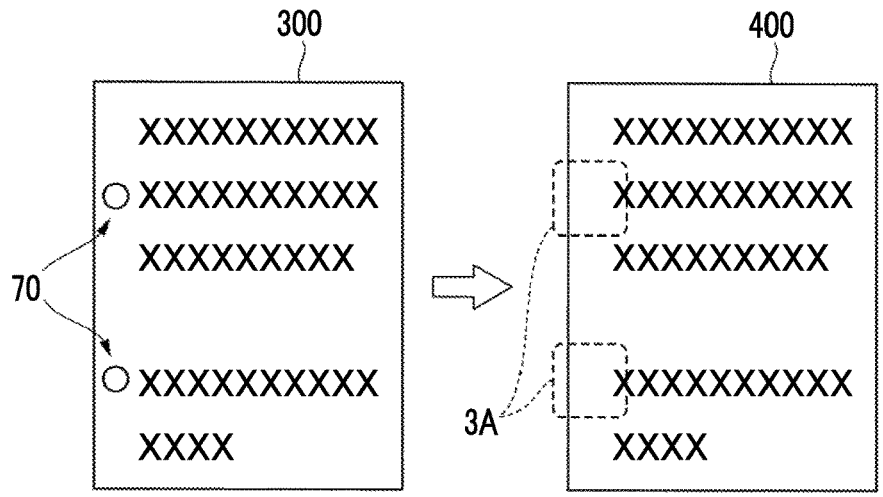
FIGS. 3A and 3B are diagrams illustrating specific examples of processing performed in this exemplary embodiment.
Figure 3B:
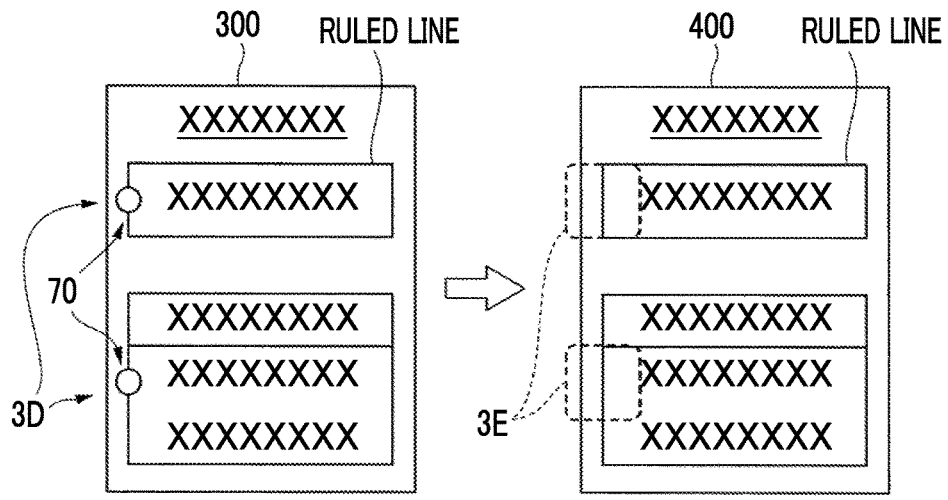

FIGS. 3A and 3B are diagrams illustrating specific examples of processing performed in this exemplary embodiment.

In the examples illustrated in FIGS. 3A and 3B, a punch hole 70 is formed in a manuscript 300 read by the image reading unit 108 (see FIG. 1).

In this case, a punch hole trace (not shown in FIGS. 3A and 3B) which is a trace of the punch hole 70 is included in reading image data 400 obtained by the image reading unit 108, and the punch hole trace detection unit 61 detects the punch hole trace in this exemplary embodiment.

In this exemplary embodiment, in a case where the punch hole trace is detected by the punch hole trace detection unit 61, the punch hole trace processing unit 63 performs processing for making the punch hole trace inconspicuous, as indicated by sign 3A in FIG. 3A.

Specifically, the punch hole trace is made inconspicuous by setting a pixel value of a pixel (pixel positioned further inside than the contour of a circular punch hole trace) which is positioned at the punch hole trace to be the same as or approximate to a pixel value of another pixel (pixel positioned further outside than the contour of the circular punch hole trace) which is positioned in the vicinity of the punch hole trace.

Further, in this exemplary embodiment, in a case where the punch hole 70 is formed on the ruled line as indicated by sign 3D in FIG. 3B, a portion of the ruled line is missed.

In this case, the punch hole trace processing unit 63 according to this exemplary embodiment performs processing for making the punch hole trace inconspicuous as indicated by sign 3E in FIG. 3B, and performs processing for interpolating a line segment on a location where the punch hole trace is positioned. In other words, processing for making the punch hole trace inconspicuous is performed, and processing for interpolating the line segment is performed.

Figure 4:
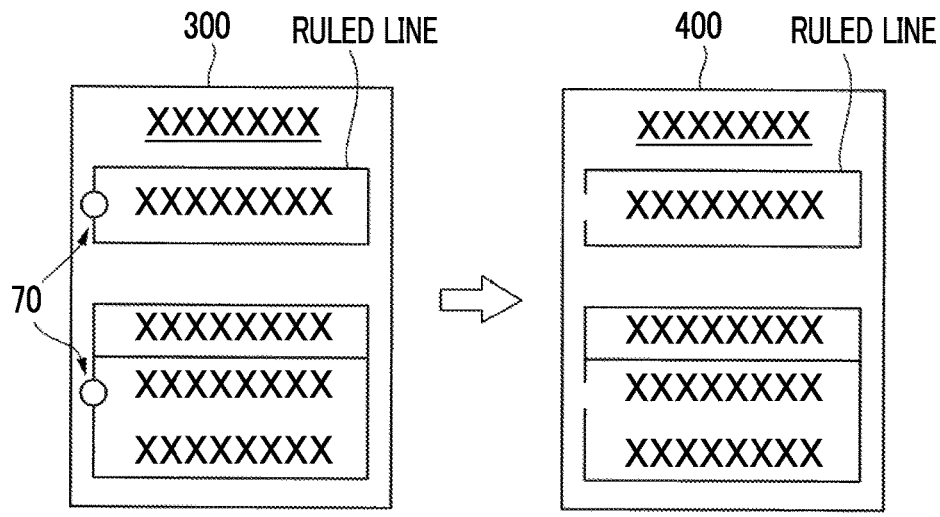
FIG. 4 is a diagram illustrating processing in a case where a line segment is not interpolated.

FIG. 4 is a diagram illustrating processing in a case where a line segment is not interpolated.

In a case where a line segment is not interpolated, only processing for making a punch hole trace inconspicuous is performed. In this case, as illustrated in FIG. 4, a state where a portion of a ruled line is missed is set in the reading image data 400.

In this case, the appearance of an image is degraded as compared to the above-described processing for interpolating a line segment according to this exemplary embodiment.

In addition, when a portion of a ruled line is missed, there is a concern that the accuracy of character recognition is degraded in a case where the character recognition and the like are performed later using Optical Character Recognition (OCR) or the like. Specifically, the character recognition may be performed using the presence of a ruled line and the like, and there is a concern that the accuracy of the character recognition is degraded when a portion of the ruled line is missed.

Figure 5A:
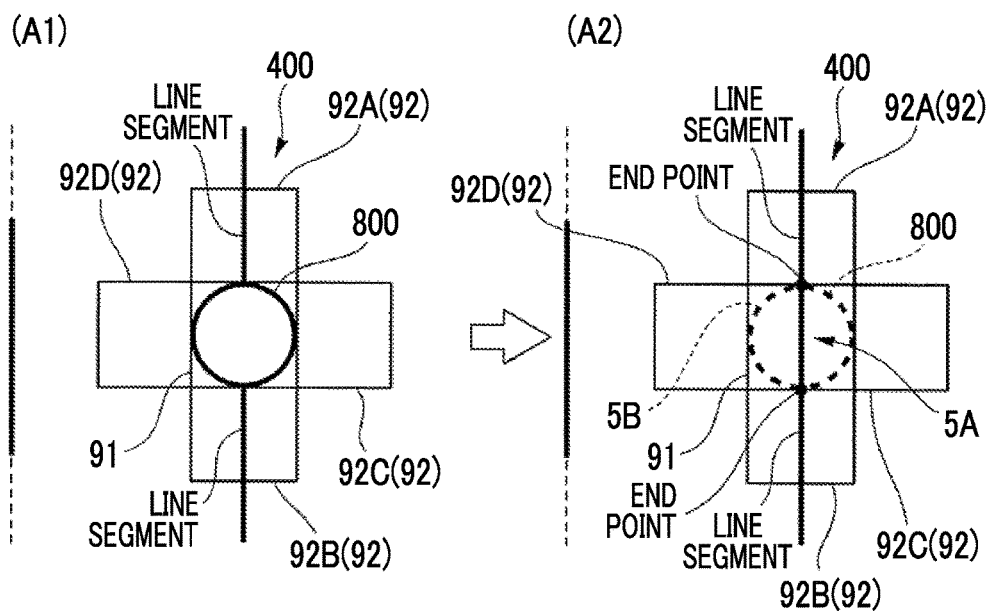
FIGS. 5A to 5C are diagrams illustrating specific examples of processing in this exemplary embodiment.
Figure 5B:
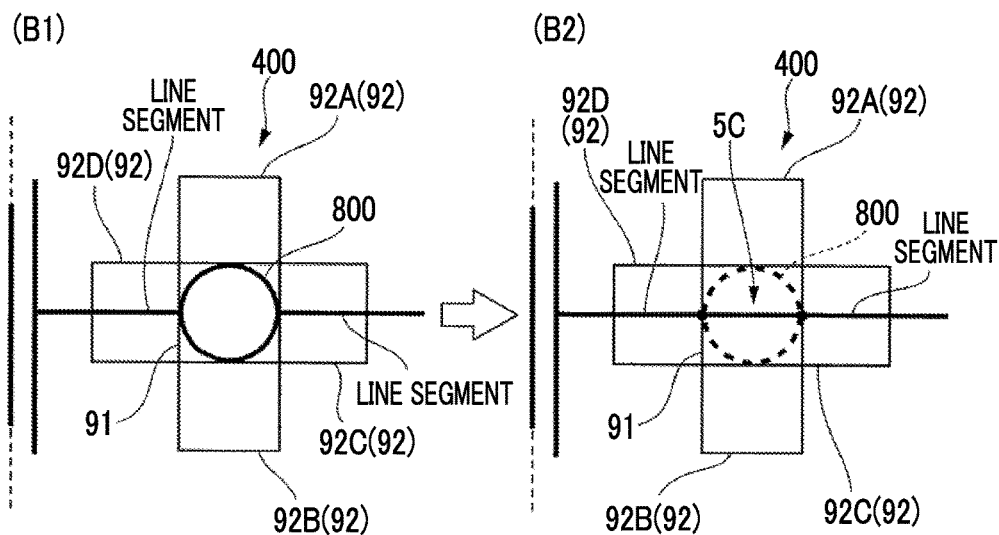
Figure 5C:
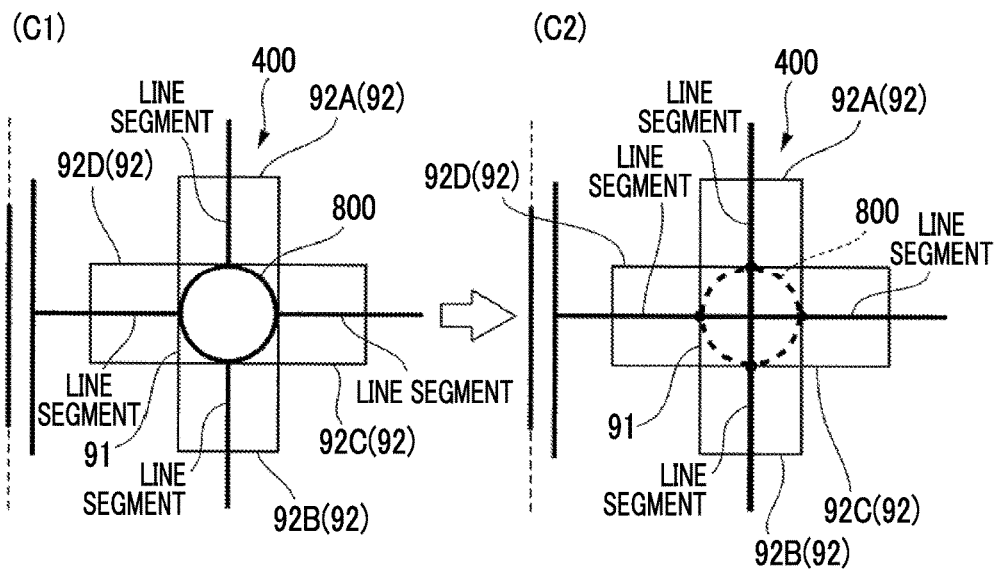

FIGS. 5A to 5C are diagrams illustrating specific examples of processing in this exemplary embodiment.

In this exemplary embodiment, in a case where a punch hole trace 800 is included in reading image data 400, the punch hole trace detection unit 61 first detects the punch hole trace 800 from the reading image data 400, and then the line segment detection unit 62 sets a rectangular region 91 including the punch hole trace 800 (hereinafter, referred to as a "punch hole trace-including region 91"), as illustrated in a part (A1) of FIG. 5A.

Thereafter, the line segment detection unit 62 sets four rectangular regions 92 (hereinafter, "line segment detection regions 92") in which a line segment is detected, the rectangular regions being rectangular regions having the same size as the punch hole trace-including region 91, as illustrated in (A1).

Specifically, the line segment detection unit 62 sets rectangular regions, adjacent to the punch hole trace-including region 91, in four directions of the upper, lower, right, and left directions with respect to the punch hole trace-including region 91 as the line segment detection regions 92.

More specifically, in this exemplary embodiment, an upper line segment detection region 92A is set on the upper side of the punch hole trace 800 (punch hole trace-including region 91), and a lower line segment detection region 92B is set on the lower side of the punch hole trace 800. In addition, a right line segment detection region 92C is set on the right side of the punch hole trace 800, and a left line segment detection region 92D is set on the left side of the punch hole trace 800.

Here, in this exemplary embodiment, four line segment detection regions 92 in which a line segment is detected are set in some regions in the vicinity of the detected punch hole trace 800. In this case, it is possible to more effectively detect a line segment, as compared to a case where the line segment detection regions 92 are set over the entire circumference in the vicinity of the punch hole trace 800.

In general, the line segments (ruled lines) are disposed along the upper, lower, right, and left directions. For this reason, when rectangular regions in four directions of the upper, lower, right, and left directions with respect to the punch hole trace 800 are set as the line segment detection regions 92, it is possible to more effectively detect a line segment, as compared to a case where the line segment detection regions 92 are set over the entire circumference in the vicinity of the punch hole trace 800.

Subsequently, in this exemplary embodiment, it is determined whether or not a line segment is present in each of the four line segment detection regions 92. In a case where a line segment is detected in any of the line segment detection regions 92, contents of interpolation of the line segment are determined in accordance with an arrangement pattern of the line segment detection region 92 in which the line segment is detected, thereby performing the interpolation of the line segment.

Specifically, in this exemplary embodiment, in a case where a line segment is detected in the line segment detection region 92 (in a case where a line segment is detected in the vicinity of the punch hole trace 800), the punch hole trace processing unit 63 forms a line segment connecting end points of the detected line segment at a location where the punch hole trace 800 is positioned, as indicated by sign 5A in (A2).

More specifically, in this exemplary embodiment, in a case where plural line segments formed so as to face the punch hole trace 800 from the vicinity of the punch hole trace 800 are present in the vicinity of the punch hole trace 800, a line segment connecting the line segments is formed at a location where the punch hole trace 800 is positioned.

Further, in this exemplary embodiment, the punch hole trace processing unit 63 performs processing for making the punch hole trace 800 inconspicuous, as indicated by a dashed line 5B in (A2).

The processing for inconspicuousness is performed by setting a pixel value of a pixel (pixel positioned further inside than the contour of the circular punch hole trace 800), which is positioned at the punch hole trace 800, to be the same as or approximate to a pixel value of another pixel, which is positioned further outside than the contour of the punch hole trace 800, and has a pixel value smaller than a pixel value determined in advance. In other words, the processing for inconspicuousness is performed by setting a pixel value of a pixel positioned at the punch hole trace 800 to be the same as or approximate to a pixel value of another pixel which is positioned further outside than the contour of the punch hole trace 800 and is not positioned on the line segment positioned in the vicinity of the punch hole trace 800.

The example illustrated in FIG. 5A shows a case where a line segment is detected in each of the line segment detection regions 92 (the upper line segment detection region 92A and the lower line segment detection region 92B) in two directions of the upper and lower directions with respect to the punch hole trace 800. In this case, in this exemplary embodiment, a line segment connecting a line segment positioned on the upper side of the punch hole trace 800 (a line segment positioned in the upper line segment detection region 92A) and a line segment positioned on the lower side of the punch hole trace 800 (a line segment positioned in the lower line segment detection region 92B) is formed at a location where the punch hole trace 800 is positioned (within the punch hole trace-including region 91), as illustrated in (A2).

In addition, in this exemplary embodiment, in a case where a line segment is detected in each of the line segment detection regions 92 (the right line segment detection region 92C and the left line segment detection region 92D) in two directions of the right and left directions with respect to the punch hole trace 800 as illustrated in a part (B1) of FIG. 5B, a line segment connecting a line segment positioned on the left side of the punch hole trace 800 (a line segment positioned in the left line segment detection region 92D) and a line segment positioned on the right side of the punch hole trace 800 (a line segment positioned in the right line segment detection region 92C) is formed at a location where the punch hole trace 800 is positioned (within the punch hole trace-including region 91), as indicated by sign 5C in (B2).

As described above, also in this case, processing for making the punch hole trace 800 inconspicuous is performed.

Further, in a case where a line segment is detected in the line segment detection regions 92 (the upper line segment detection region 92A, the lower line segment detection region 92B, the right line segment detection region 92C, and the left line segment detection region 92D) in four directions of the upper, lower, right, and left directions with respect to the punch hole trace 800 as illustrated in a part (C1) of FIG. 5C, a line segment connecting line segments detected in the respective regions (the upper line segment detection region 92A and the lower line segment detection region 92B) in two directions of the upper and lower directions is formed at a location where the punch hole trace 800 is positioned, as illustrated in (C2).

In addition, in this case, a line segment connecting line segments detected in the respective regions (the right line segment detection region 92C and the left line segment detection region 92D) in two directions of the right and left directions is formed.

That is, in the examples illustrated in FIGS. 5A to 5C, in a case where a line segment is detected in all of the set four line segment detection regions 92, a line segment is detected in two line segment detection regions 92 positioned on the upper and lower sides of the punch hole trace-including region 91, or a line segment is detected in two line segment detection regions 92 positioned on the right and left sides of the punch hole trace-including region 91, a line segment connecting the line segments positioned on the upper and lower sides of the punch hole trace-including region 91 is formed, and/or a line segment connecting the line segments positioned on the right and left sides of the punch hole trace-including region 91 is formed.

Further, in this exemplary embodiment, in a case where a line segment is detected in the line segment detection region 92 in any one direction of the two directions of the upper and lower directions with respect to the punch hole trace 800 and in the line segment detection region 92 in any one direction of the two directions of the right and left directions, or in a case where a line segment is detected in the line segment detection regions 92 in three directions among the line segment detection regions 92 in four directions of the upper, lower, right, and left directions with respect to the punch hole trace 800, a line segment connecting each line segment and an intersection location at which extended lines of the detected line segments intersect each other is formed at a location where the punch hole trace 800 is positioned.

As a specific example, for example, in a case where a line segment is detected in the upper line segment detection region 92A (hereinafter, referred to as an "upper line segment") and a line segment is detected in the right line segment detection region 92C (hereinafter, referred to as a "right line segment") as illustrated in a part (A1) of FIG. 6(A), an intersection location C where an extended line of the upper line segment and an extended line of the right line segment intersect each other is obtained, and a line segment connecting the obtained intersection location C and each line segment (the upper line segment and the right line segment) is formed at a location where the punch hole trace 800 is positioned as illustrated in (A2).

In addition, for example, also in a case where line segments (hereinafter, line segments detected in the respective line segment detection regions 92 will be referred to as an "upper line segment", a "lower line segment", and a "right line segment") are respectively detected in the line segment detection regions 92 positioned on the upper, lower, and right sides of the punch hole trace 800 (the line segment detection regions 92 among the line segment detection regions 92 in four directions of the upper, lower, right, and left directions) as illustrated in a part (B1) of FIG. 6(B), an intersection location C where extended lines of the upper, lower, and right line segments intersect each other is obtained at a location where the punch hole trace 800 is positioned as illustrated in (B2). A line segment connecting the intersection location C and each line segment (the upper line segment, the lower line segment, and the right line segment) is formed.

Further, in this exemplary embodiment, in a case where a line segment is not detected in the vicinity of the punch hole trace 800 (in a case where a line segment is not detected in the line segment detection regions 92 in four directions of the upper, lower, right, and left directions with respect to the punch hole trace 800) or in a case where a line segment is detected in only the line segment detection region 92 in any one direction among the line segment detection regions 92 in four directions of the upper, lower, right, and left directions, a line segment is not formed at a location where the punch hole trace 800 is positioned.

Figure 7A:
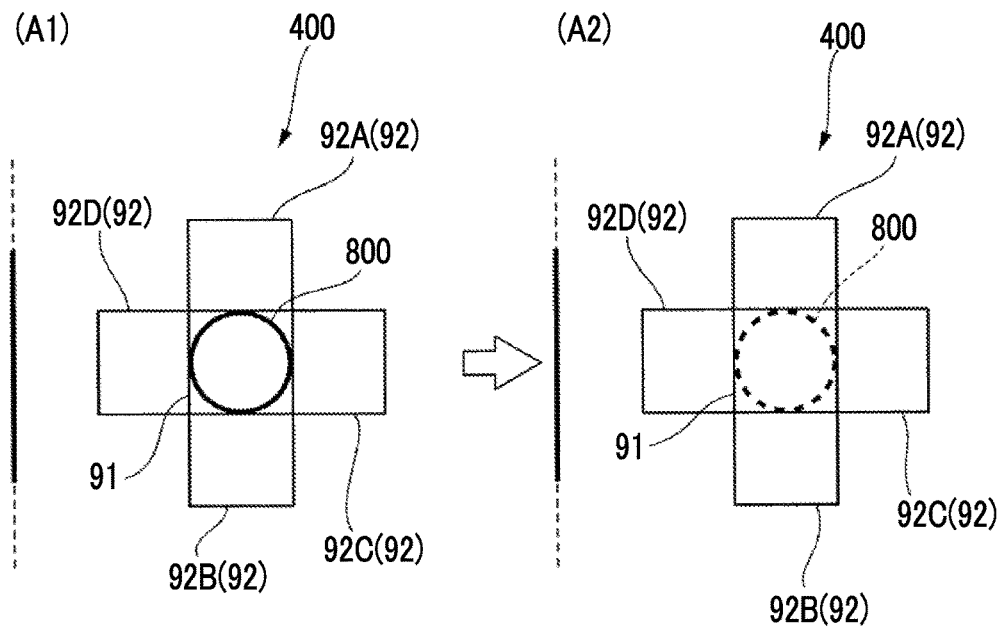
FIGS. 7A and 7B are diagrams illustrating specific examples of processing in this exemplary embodiment.

Specifically, for example, in a case where a line segment is not present in the vicinity of the punch hole trace 800 and a line segment is not detected in the line segment detection regions 92 in four directions of the upper, lower, right, and left directions as illustrated in a part (A1) of FIG. 7(A), a line segment is not formed at a location where the punch hole trace 800 is positioned as illustrated in (A2).

Figure 7B:
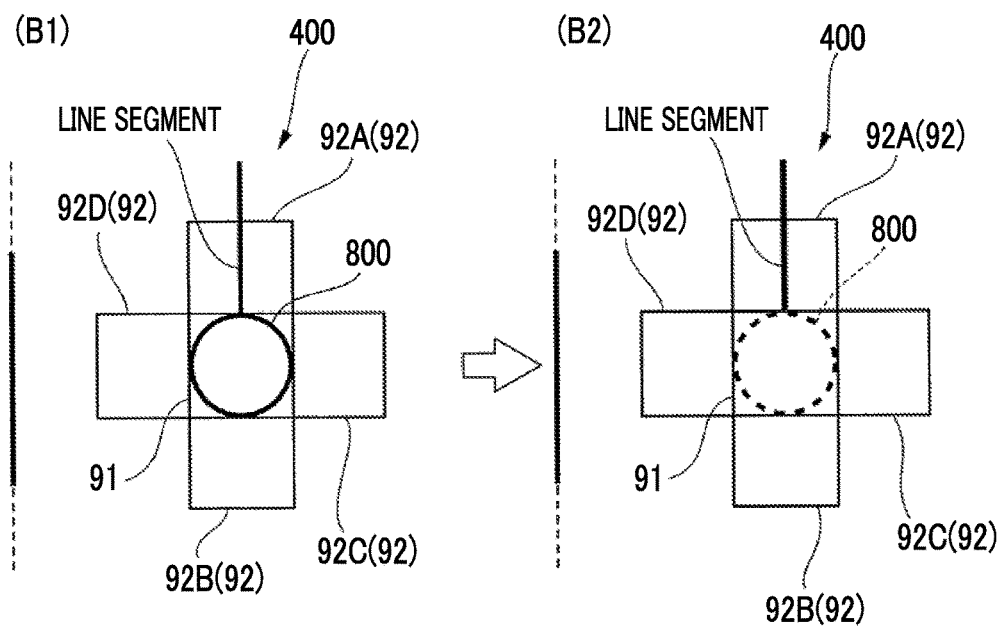

In addition, also in a case where a line segment is detected, for example, in only one line segment detection region 92 (the upper line segment detection region 92A) which is positioned on the upper side of the punch hole trace 800 as illustrated in a part (B1) of FIG. 7(B), a line segment is not formed at a location where the punch hole trace 800 is positioned as illustrated in (B2).

In a case where a line segment is not detected in the vicinity of the punch hole trace 800 and a line segment is detected in only the line segment detection region 92 in any one direction among the line segment detection regions 92 in four directions of the upper, lower, right, and left directions, it is assumed that a line segment is not originally present in the punch hole trace 800.

For this reason, in this exemplary embodiment, as described above, in a case where a line segment is not detected in the vicinity of the punch hole trace 800 or in a case where a line segment is detected in only the line segment detection region 92 in any one direction, processing for not forming a line segment is performed.

FIGS. 8 and 9 are flow charts illustrating a series of flows of the above-described processing.

In the processing according to this exemplary embodiment, when reading image data is generated by the image reading unit 108, the punch hole trace detection unit 61 analyzes the reading image data. In a case where the punch hole trace 800 is present in the reading image data, the punch hole trace detection unit 61 detects the punch hole trace 800 (step 101).

Subsequently, the line segment detection unit 62 performing the setting of the punch hole trace-including region 91, and performs the setting of the above-described four line segment detection regions 92 (the upper line segment detection region 92A, the lower line segment detection region 92B, the right line segment detection region 92C, and the left line segment detection region 92D) (step 102).

Subsequently, the line segment detection unit 62 extracts a pixel value of each pixel (extracts a background pixel value) in each of the line segment detection regions 92 (step 103), and binarizes the pixel value of each pixel (step 104). Subsequently, the line segment detection unit 62 extracts a line segment in each of the line segment detection regions 92 on the basis of the binarized pixel value of each pixel (step 105).

The line segment detection unit 62 determines whether or not a line segment has been detected in each of the line segment detection regions 92 (step 106). In a case where it is determined that the line segment has been detected, the line segment detection unit 62 extracts information on the end point, thickness, and color of the line segment (step 107).

Subsequently, the line segment detection unit 62 determines whether or not a process of detecting a line segment has been performed in all of the four line segment detection regions 92 (step 108), and proceeds to the process of step 109 illustrated in FIG. 9 in a case where it is determined that the process of detecting a line segment has been performed in all of the four line segment detection regions 92.

On the other hand, in a case where it is not determined in step 108 that the process of detecting a line segment has been performed in all of the four line segment detection regions 92, the process of step 107 is performed again.

In the process of step 109, it is determined to which arrangement pattern an arrangement pattern of the line segment detection region 92 having a line segment detected therein corresponds.

In a case where an arrangement position of the line segment detection region 92 having a line segment detected therein is an arrangement pattern in which the line segment detection regions are at four locations of upper, lower, right, and left locations or an arrangement pattern in which the line segment detection regions are at two locations of upper and lower locations or right and left locations (in a case where a line segment is detected in all of the four line segment detection regions 92 or a line segment is detected in the line segment detection regions 92 at two locations of upper and lower locations or right and left locations), a line segment connecting line segments positioned on the upper and lower sides of the punch hole trace 800 is formed and/or a line segment connecting line segments positioned on the right and left sides of the punch hole trace 800 is formed, as illustrated in FIGS. 5A to 5C (step 110).

Subsequently, in this exemplary embodiment, the punch hole trace-including regions 91 are sequentially performed with a pixel positioned in the punch hole trace-including region 91 as an attention pixel (step 111).

It is determined whether or not the attention pixel is a pixel (pixel on the line segment formed in step 110) on the line segment (step 112). In a case where the attention pixel is not a pixel on the line segment, a pixel value of the attention pixel is replaced by a pixel value of the background pixel (another pixel which is positioned further outside than the contour of the punch hole trace 800 and is positioned on the line segment positioned in the vicinity of the punch hole trace 800) (step 113), and the processing proceeds to the process of step 114. The process of step 113 is performed so as not to make the punch hole trace 800 inconspicuous.

On the other hand, in a case where the attention pixel is a pixel on the line segment, the processing proceeds to the process of step 114 without performing the replacement of a pixel (without performing the process of step 113).

In the process of step 114, it is determined whether or not the attention pixel is a final pixel, and the process of step 112 and the subsequent processes are performed again in a case where the attention pixel is not a final pixel. On the other hand, in a case where the attention pixel is a final pixel, the processing proceeds to the process of step 116.

On the other hand, in step 109, in a case where it is determined that the arrangement position of the line segment detection region 92 having a line segment detected therein is an arrangement pattern which is any one location of the upper, lower, right, and left locations (in a case where a line segment is detected in only the line segment detection region 92 in any one direction among the four directions of the upper, lower, right, and left directions) or in a case where it is determined that the arrangement position is an arrangement pattern in which a line segment is not detected in any direction of the upper, lower, right, and left directions (in a case where a line segment is not detected in any of the line segment detection regions 92 in four directions of the upper, lower, right, and left directions), the forming of a line segment is not performed.

In this case, as illustrated in step 115, a process of replacing a pixel value of each pixel positioned within the punch hole trace-including region 91 by a pixel value of the background pixel is performed (step 115).

More specifically, a process of replacing a pixel value of each pixel positioned within the punch hole trace-including region 91 by a pixel value of another pixel (another pixel which is positioned further outside than the contour of the punch hole trace 800 and is not positioned on the line segment positioned in the vicinity of the punch hole trace 800) which is positioned further outside than the contour of the punch hole trace 800 and has a pixel value smaller than a pixel value determined in advance is performed.

In the process of step 116, it is determined whether or not the processing has been terminated with respect to all of the punch hole traces 800 detected in step 101, and the overall processing is terminated in a case where the processing has been terminated. On the other hand, in a case where it is determined that the processing has not been terminated, the process of step 102 and the subsequent processes are performed again.

Next, the process of step 117 and the subsequent processes will be described.

In this exemplary embodiment, in a case where the process of step 110 or the process of step 115 is not performed, the processing proceeds to the process of step 117.

More specifically, in a case where a line segment is detected in the line segment detection region 92 in any one direction of two directions of the upper and lower directions with respect to the punch hole trace 800 and a line segment is detected in the line segment detection region 92 in any one direction of two directions of the right and left directions or in a case where a line segment is detected in the line segment detection regions 92 in three directions among the line segment detection regions 92 in four directions of the upper, lower, right, and left directions with respect to the punch hole trace 800, the processing proceeds to the process of step 117.

Figure 6A:
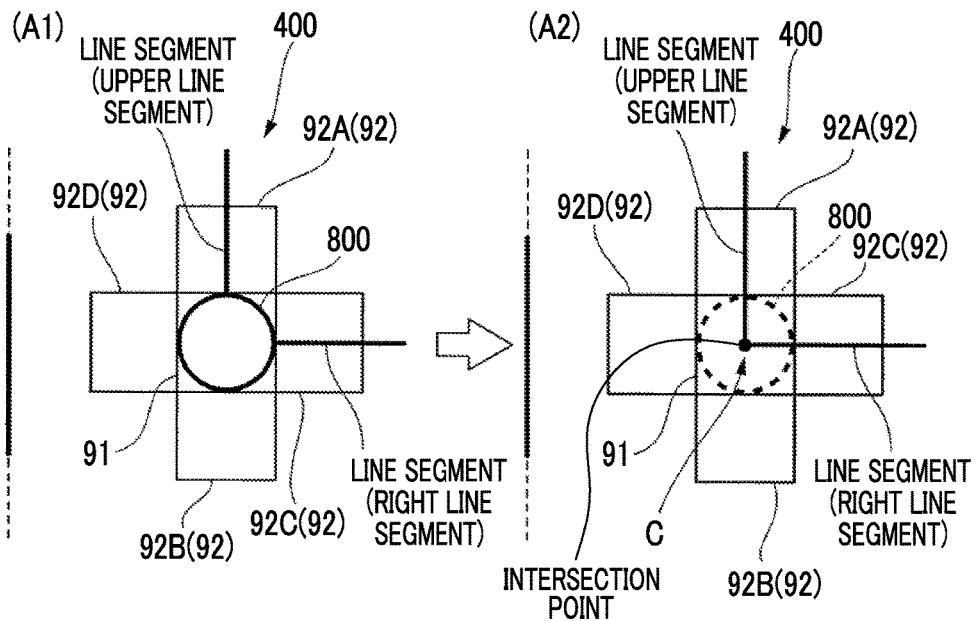
FIGS. 6A and 6B are diagrams illustrating specific examples of processing in this exemplary embodiment.
Figure 6B:
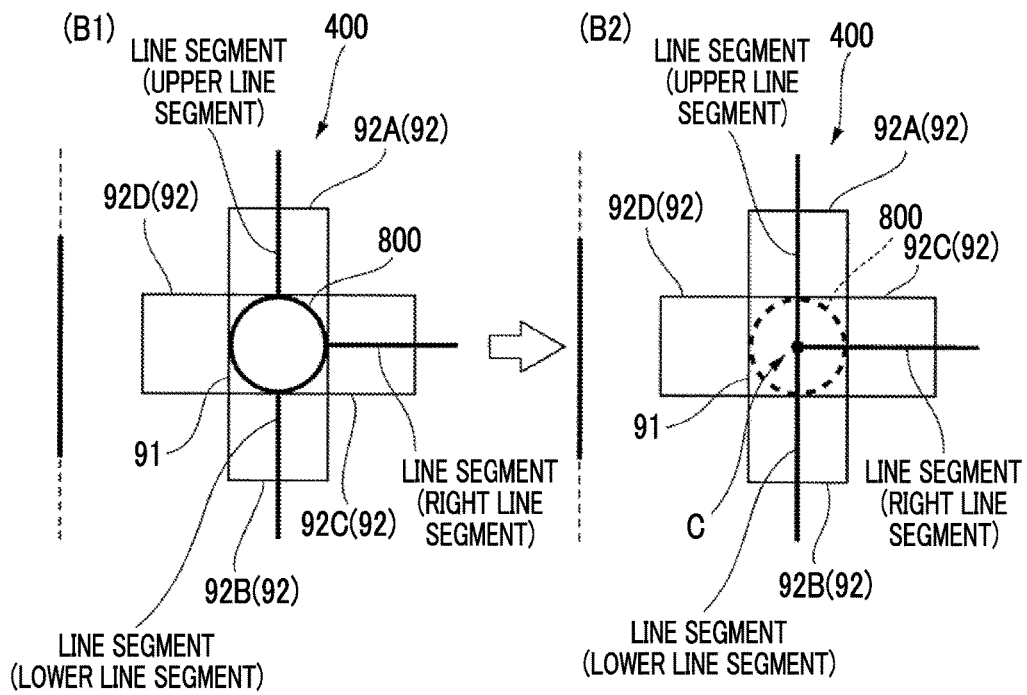

In the process of step 117, an intersection location C where extended lines of the detected line segments intersect each other within the punch hole trace-including region 91 is obtained as illustrated in FIGS. 6A and 6B.

Subsequently, a line segment connecting the obtained intersection location C and each line segment detected is formed (step 118).

Subsequently, similar to step 111 described above, the punch hole trace-including regions 91 are sequentially performed with a pixel positioned within the punch hole trace-including region 91 as an attention pixel (step 119).

Thereafter, the processing proceeds to the process of step 112 and the subsequent processes, but the process of step 112 and the subsequent processes are as described above and will not be described here.

Figure 10:
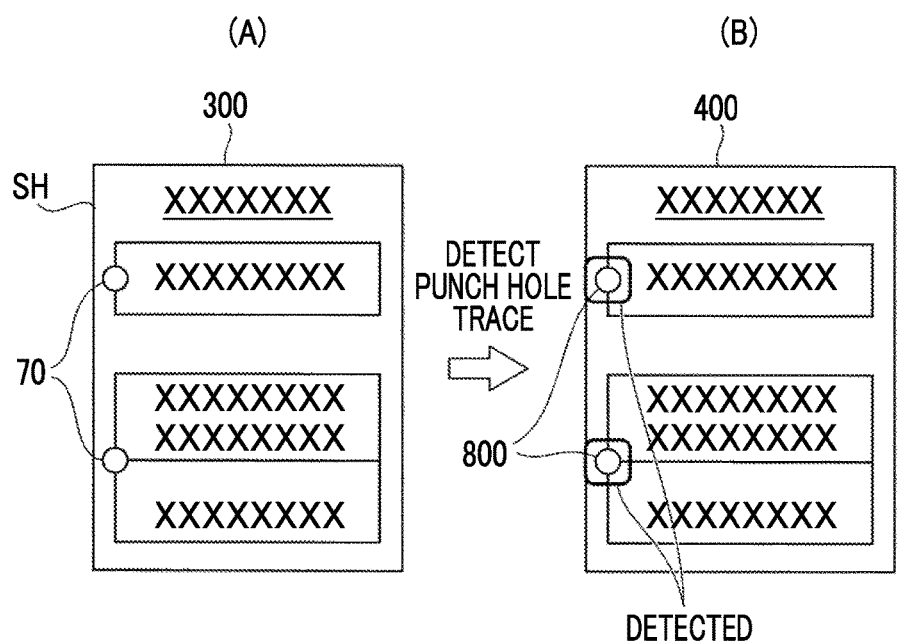
FIG. 10 is a diagram illustrating a specific example of processing.
Figure 11:
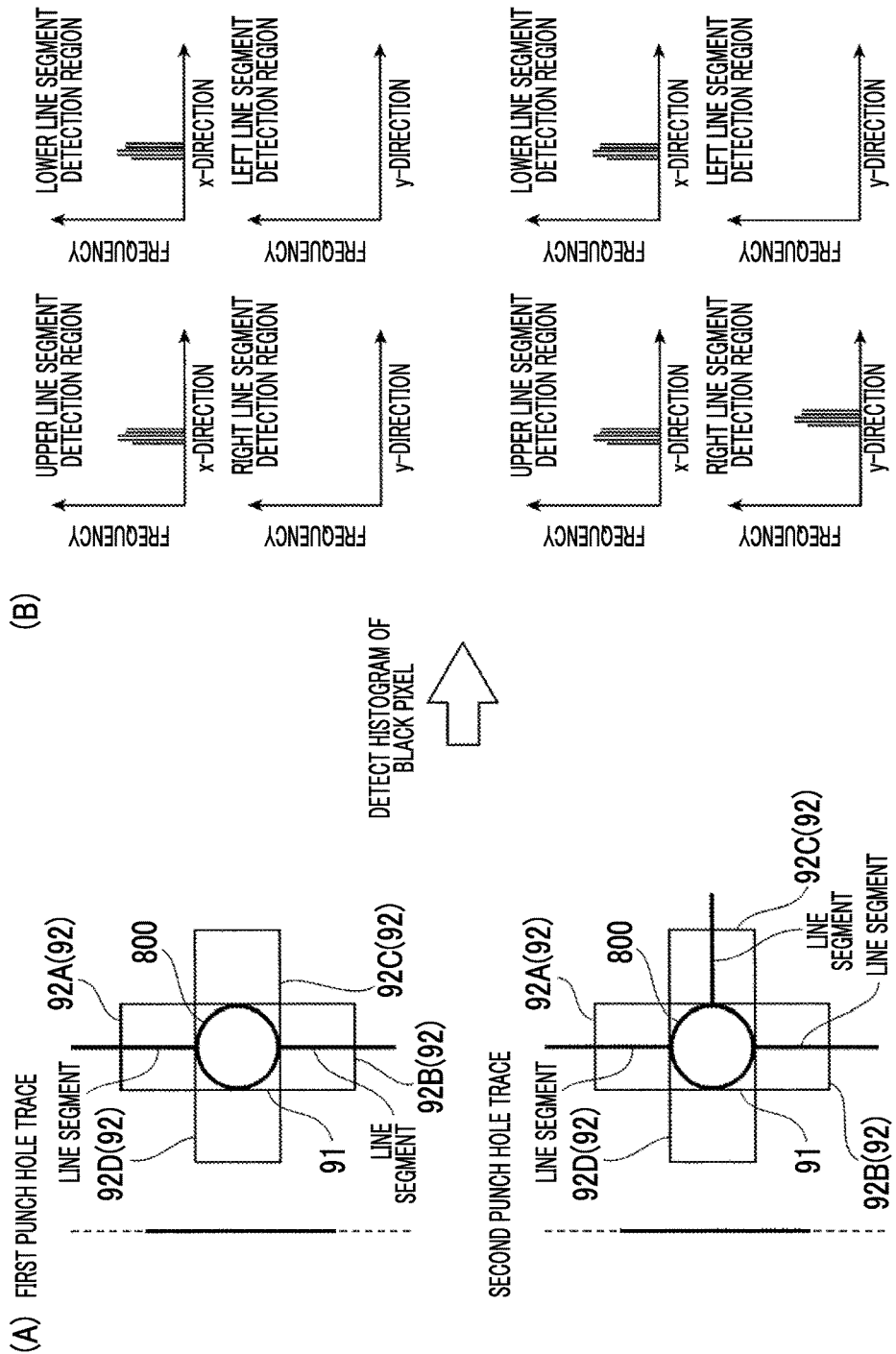
FIG. 11 is a diagram illustrating a specific example of processing.
Figure 12:
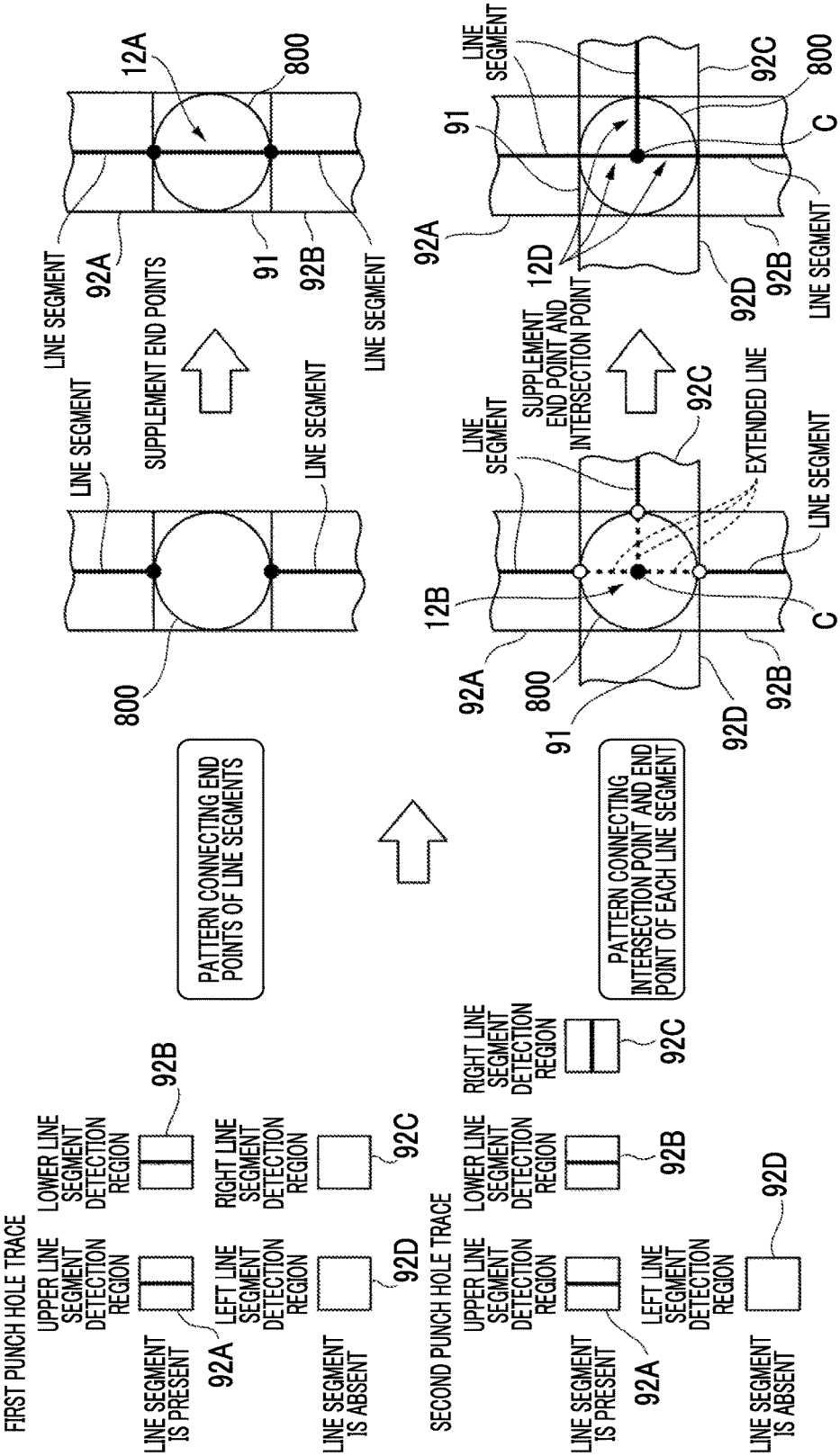
FIG. 12 is a diagram illustrating a specific example of processing.

Parts (A) and (B) in FIG. 10, Parts (A) and (B) in FIG. 11, and Parts (A) and (B) in FIG. 12 are diagrams illustrating specific examples of the processing.

In these specific examples, a description will be given of processing in a case where two punch holes 70 are formed along a left side SH of the manuscript 300, as illustrated in the part (A) in FIG. 10.

In this case, first, the reading image data 400 (see the part (B) in FIG. 10) is analyzed by the punch hole trace detection unit 61, and the punch hole trace 800 caused by the two punch holes 70 is detected.

Subsequently, as illustrated in the part (A) in FIG. 11, the punch hole trace-including region 91 including the punch hole traces 800 is set.

Subsequently, as illustrated in the part (A) in FIG. 11, four line segment detection regions 92 (the upper line segment detection region 92A, the lower line segment detection region 92B, the right line segment detection region 92C, and the left line segment detection region 92D) which have the same size as the punch hole trace-including region 91 are set corresponding to each of the two punch hole trace-including regions 91.

Subsequently, as illustrated in the part (B) in FIG. 11, the line segment detection unit 62 obtains a histogram of a black pixel (a pixel having a pixel value exceeding a threshold value determined in advance) on the basis of pixel values of pixels included in each of the line segment detection regions 92. Subsequently, the line segment detection unit 62 determines whether or not a line segment is present in each of the line segment detection regions 92 on the basis of the histogram.

Meanwhile, in this exemplary embodiment, the detection of a line segment is performed on the basis of the histogram in this manner, but the detection of a line segment may be performed using other known methods such as Hough transformation.

In this example, as illustrated in the part (A) in FIG. 12, it is determined that a line segment is present in two line segment detection regions 92 of the upper line segment detection region 92A and the lower line segment detection region 92B among four line segment detection regions 92, with respect to the first punch hole trace 800 positioned on the upper side.

In this case, the processing illustrated in step 110 described above is executed, and a line segment connecting a line segment positioned in the upper line segment detection region 92A and a line segment positioned in the lower line segment detection region 92B is formed in the punch hole trace-including region 91 (a location where the punch hole trace 800 is positioned), as indicated by sign 12A in the part (B) in FIG. 12.

Thereafter, although not shown in the drawing, processing for making the punch hole trace 800 inconspicuous is performed as illustrated in step 113 and the like.

In addition, as illustrated in the part (A) in FIG. 12, it is determined that a line segment is present in three line segment detection regions 92 of the upper line segment detection region 92A, the lower line segment detection region 92B, and the right line segment detection region 92C among four line segment detection regions 92, with respect to the second punch hole trace 800 positioned on the lower side.

In this case, the processing illustrated in steps 117 and 118 described above is executed, and an intersection location C where extended lines of the detected line segments intersect each other is first obtained as indicated by sign 12D in the part (B) in FIG. 12.

Thereafter, as indicated by sign 12D in the part (B) in FIG. 12, a line segment connecting the obtained intersection location C and each line segment is formed. Thereafter, as described above, processing for making the punch hole trace 800 inconspicuous is performed.

OTHERS

Meanwhile, in the above description, the image reading unit 108 (scanner apparatus) and a processing functional unit performing processing related to a punch hole trace are provided within the image forming apparatus 10 which is one apparatus, but the image reading unit 108 and the processing functional unit may be respectively provided in separate apparatuses. In this case, reading image data is generated by the image reading unit 108, and the reading image data is transmitted to the processing functional unit, which is provided in a separate apparatus, from the image reading unit 108. Processing related to the punch hole trace is performed by the processing functional unit provided in a separate apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor, configured to:
detect a punch hole trace from an input image;
detect a line segment, positioned in a vicinity of the detected punch hole trace, from the input image; and
perform processing on the punch hole trace for making the punch hole trace inconspicuous on the basis of a result of the detection on the line segment.

2. The image processing apparatus according to claim 1, wherein the processor is configured to perform detection of a line segment in some regions in the vicinity of the detected punch hole trace.

3. The image processing apparatus according to claim 2, wherein the some regions in the vicinity of the detected punch hole trace are regions in four directions of upper, lower, right, and left directions with respect to the punch hole trace.

4. The image processing apparatus according to claim 1, wherein the processor is configured to form a line segment connecting line segments detected in the vicinity of the punch hole trace at a location where the punch hole trace is positioned.

5. The image processing apparatus according to claim 4, wherein the processor is configured to form a line segment connecting line segments directed to the punch hole trace from the vicinity of the punch hole trace at a location where the punch hole trace is positioned.

6. The image processing apparatus according to claim 4, wherein the processor is configured not to form a line segment at a location where the punch hole trace is positioned, in a case where a line segment is not detected in the vicinity of the punch hole trace, or in a case where a line segment is detected in a region in any one direction among the four directions of the upper, lower, right, and left directions with respect to the punch hole trace.

7. The image processing apparatus according to claim 4, wherein the processor is configured to form a line segment connecting a line segment positioned above the punch hole trace and a line segment positioned below the punch hole trace at a location where the punch hole trace is positioned, in a case where a line segment is detected in each of the regions in two directions of the upper and lower directions with respect to the punch hole trace.

8. The image processing apparatus according to claim 4, wherein the processor is configured to form a line segment connecting a line segment positioned on a left side of the punch hole trace and a line segment positioned on a right side of the punch hole trace at a location where the punch hole trace is positioned, in a case where a line segment is detected in each of the regions in two directions of the right and left directions with respect to the punch hole trace.

9. The image processing apparatus according to claim 4, wherein the processor is configured to form a line segment connecting line segments detected in the respective regions in two directions of the upper and lower directions and forms a line segment connecting line segments detected in the respective regions in two directions of the right and left directions at a location where the punch hole trace is positioned, in a case where a line segment is detected in each of the regions in four directions of the upper, lower, right, and left directions with respect to the punch hole trace.

10. The image processing apparatus according to claim 4, wherein the processor is configured to form a line segment connecting each line segment and an intersection location where extended lines of the detected line segments intersect each other at a location where the punch hole trace is positioned, in a case where a line segment is detected in a region in any one direction of the two directions of the upper and lower directions and a line segment is detected in a region in any one direction of the two directions of the right and left directions with respect to the punch hole trace, or in a case where a line segment is detected in regions in three directions among the regions in the four directions of the upper, lower, right, and left directions with respect to the punch hole trace.

11. The image processing apparatus according to claim 1, wherein the processor is further configured to interpolate a new line segment on a location where any line segment is missed due to the punch hole trace.

12. An image reading apparatus comprising:
- a scanner apparatus, configured to read an image on a manuscript to generate reading image data;
- a processor, configured to:
- detect a punch hole trace from the reading image data;
- detect a line segment, positioned in a vicinity of the detected punch hole trace, from the input image; and
- perform processing on the punch hole trace for making the punch hole trace inconspicuous on the basis of a result of the detection on the line segment.

13. A non-transitory computer readable medium storing a program causing a computer to realize:
- a punch hole trace detection function of detecting a punch hole trace from an input image;
- a line segment detection function of detecting a line segment, positioned in a vicinity of the detected punch hole trace, from the input image; and
- a punch hole trace processing function of performing processing on the punch hole trace for making the punch hole trace inconspicuous on the basis of a result of the detection on the line segment.

* * * * *